(12) United States Patent
Kawai et al.

(10) Patent No.: US 8,101,269 B2
(45) Date of Patent: Jan. 24, 2012

(54) POROUS FIRED BODY AND MANUFACTURING METHOD THEREOF

(75) Inventors: Masaaki Kawai, Nishikasugai County (JP); Kenji Morimoto, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 520 days.

(21) Appl. No.: 12/343,738

(22) Filed: Dec. 24, 2008

(65) Prior Publication Data
US 2009/0169805 A1    Jul. 2, 2009

(30) Foreign Application Priority Data
Dec. 26, 2007  (JP) ................. 2007-334761

(51) Int. Cl.
B32B 3/26    (2006.01)
B32B 5/18    (2006.01)
B29C 44/02   (2006.01)

(52) U.S. Cl. ........... 428/317.9; 428/116; 428/118; 428/312.6; 428/312.8; 428/316.6; 428/317.7; 428/698; 428/697; 428/702; 264/42; 264/43; 264/45.1; 264/45.3; 264/46.4; 501/88

(58) Field of Classification Search .......... None
See application file for complete search history.

(56) References Cited

U.S. PATENT DOCUMENTS

| 5,459,112 A | 10/1995 | Kim |
| 2003/0134084 A1 | 7/2003 | Ichikawa et al. |
| 2004/0142145 A1 | 7/2004 | Hashimoto et al. |
| 2004/0258582 A1 | 12/2004 | Miwa et al. |

FOREIGN PATENT DOCUMENTS

| EP | 1 493 722 A1 | 1/2005 |
| EP | 1 552 882 A1 | 7/2005 |
| EP | 1 600 432 A1 | 11/2005 |
| EP | 1 808 228 A1 | 7/2007 |
| EP | 2 006 269 A2 | 12/2008 |
| JP | A 2002-201082 | 7/2002 |
| JP | A 2003-10616 | 1/2003 |
| JP | A 2003-254034 | 9/2003 |

*Primary Examiner* — Ling Xu
(74) *Attorney, Agent, or Firm* — Oliff & Berridge, PLC

(57) ABSTRACT

A porous fired body including a structure that aggregates are bonded by a bonding material, wherein the aggregates include oxide particles having a larger thermal capacity per unit volume than an SiC particle and SiC, the bonding material includes metallic Si, volume ratio of the metallic Si in the whole porous fired body is between 8 and 43% by volume, volume ratio of the particles of the oxide in the whole aggregates is between 14 and 55% by volume, the SiC particles and the oxide particles respectively include one or more particle groups, and an average particle size of each particle group is within a range of between 5 and 100 μm.

7 Claims, 2 Drawing Sheets

POROUS FIRED BODY AND MANUFACTURING METHOD THEREOF

FIELD OF THE INVENTION

The present invention relates to a porous fired body having a structure that aggregates are bonded by a bonding material and a manufacturing method thereof.

DESCRIPTION OF THE RELATED ARTS

Si-bonded SiC (Si—SiC) is a porous fired body having a structure, where SIC particles are used as an aggregate and is bonded by a bonding material including metallic Sir and is widely used, for example, as a base material of a diesel particulate filter (DPF) for trapping a particulate matter such as soot included in exhaust gas making use of heat resistance property or high thermal conductivity of the SiC particles to be the aggregate (e.g. refer to the Patent Document 1).

The DPF is a honeycomb structured filter (a honeycomb filter) which generally has an inlet side end surface 3 which is an inlet side of a fluid and an outlet side end surface 5 which is an outlet side of the fluid, and a plurality of cells (through-holes) 9 which are defined by a porous partition wall 7 which forms a flow channel of the fluid, as shown in FIGS. 3 and 4. The DPF is generally used in a condition where a sealed portion 11 for sealing an open end of a predetermined cell 9a on end surface of the inlet side 3 and for sealing an open end of a remaining cell 9b on end surface of the outlet side 5 is provided.

If a fluid including soot is flown into from end surface of the inlet side 3 of a honeycomb filter 1 to which sealing is thus carried out, the fluid flows into the filter from the cell 9b with an open end which is not sealed on end surface of the inlet side 3, passes the porous partition 7 having a filtration ability, and enters another cell 9a with unsealed outlet side end surface 5. Then, when the fluid passes through the partition 7, soot in the fluid is caught by the partition 7 and fluid thus purified by removing soot is exhausted from end surface of the outlet side 5.

Meanwhile, to use the DPF continuously for a long period of time, it is required to periodically carry out regeneration of the filter. That is, it is required to burn and remove the soot accumulated inside the filter to reduce pressure loss increased by soot accumulated inside the filter with time and to revert the filter performance to the initial condition. In this regeneration (when soot is burned), the center portion in cross-section where heat is not easily released is easily heated and there may be a case where localized abnormal increase in temperature occurs. Because metallic Si having a low thermal capacity is used as the bonding material of the DPF including Si—SiC, the base material has a low thermal capacity as a whole and therefore a crack due to thermal stress caused by localized abnormal increase in temperature mentioned above easily occurs. Moreover, in a case where the DPF supports a catalyst for the purpose of enhancing combustion of soot, the catalyst may be deactivated due to the heat.

As a countermeasure to suppress such an abnormal increase in temperature, for example, a honeycomb filter in which part of partition walls of the filter is thickened or cell density is partially raised to partially increase thermal capacity is disclosed in the Patent Document 2. Moreover, in the Patent Document 3, a honeycomb filter with partially increased thermal capacity realized by thickening part of partition walls of a honeycomb segment or a bonding material layer in a honeycomb structure where a base material divided into a plurality of pieces (honeycomb segment) is joined to be integrated is disclosed.

However, in a case where the part of the partition walls or bonding material layer of the filter is thickened or cell density is raised, while thermal capacity is increased and localized abnormal increase in temperature when the filter is regenerated can be suppressed on one hand, there occurs a problem on the other hand such as an effective area of the filter is reduced and pressure loss is increased.

[Patent Document 1] JP-A-2002-201082
[Patent Document 2] JP-A-2003-10616
[Patent Document 3] JP-A-2003-254034

The present invention has been made in consideration of such conventional problems and is aimed at providing a porous fired body which has larger thermal capacity per unit volume than conventionally used Si—SiC and can effectively absorb heat generated in the regeneration of the filter to suppress localized abnormal increase in temperature without providing a high-thermal capacity means which may give bad influence to filter characteristics (effective area of the filter, pressure loss, and the like) in a case where the present invention is used as a base material of the filter of the DPF or the like.

SUMMARY OF THE INVENTION

To achieve the above-mentioned purpose, following porous fired body and a manufacturing method of a porous fired body will be provided according to the present invention.

[1] A porous fired body including a structure that aggregates are bonded by a bonding material, wherein the aggregates include particles of an oxide having a larger thermal capacity per unit volume than an SiC particle and SiC, the bonding material includes metallic Si, volume ratio of the metallic Si in the whole porous fired body is between 8 and 43% by volume, volume ratio of the particle of the oxide in the whole of the aggregates is between 14 and 55% by volume, the SiC particles and the oxide particles respectively include one or more particle groups, and an average particle size of each particle group is within a range of between 5 and 100 μm.

[2] The porous fired body described in [1], wherein the oxide is one or more types of oxide selected from a group of $Al_2O_3$ and $MgAl_2O_4$.

[3] The porous fired body described in either [1] or [2], wherein ratio of open pores is between 30 and 75%.

[4] The porous fired body described in any one of [1] to [3], wherein an average pore diameter is between 5 and 50 μm.

[5] The porous fired body described in any one of [1] to [4], wherein the porous fired body has a honeycomb shape.

[6] A manufacturing method of a porous fired body including a structure that aggregates are bonded by a bonding material, wherein a base material, in which SiC particles to be an aggregate including one or more particle groups respectively having an average particle size of between 5 and 100 μm, an oxide particle to be the aggregate having larger thermal capacity per unit volume than the SiC including one or more particle groups respectively having an average particle size of between 5 and 100 μm, and a metallic Si to be the bonding material are mixed so that volume ratio of the metallic Si in the whole of a finally obtained porous fired body becomes between 8 and 43% by volume and volume ratio of the oxide particles in the aggregate becomes between 14 and 55% by volume, is used to prepare a clay for forming, the clay for forming is shaped into a predetermined shape, and subsequently is fired.

[7] The manufacturing method of a porous fired body described in [6], wherein maximum temperature in the firing is between 1,300 and 1,800° C.

The porous fired body of the present invention has larger thermal capacity per unit volume than Si—SiC conventionally used for a base material or the like of a DPF. Therefore, if this porous fired body is used as, for example, a base material of the DPF, because thermal capacity of the base material itself is high, it becomes possible to achieve high-thermal capacity of the whole filter without providing a high-thermal capacity means which may give a bad influence to the filter characteristics such as increase in a thickness of partition wall and cell density or the like. As a result, it becomes possible to suppress localized abnormal increase in temperature in regeneration of the filter and to prevent generation of a crack by thermal stress or deactivation by heat of a catalyst supported by the DPF. Moreover, according to the manufacturing method of the present invention, it becomes possible to manufacture such a porous fired body having high thermal capacity.

REFERENCE NUMERALS

Figure 1:
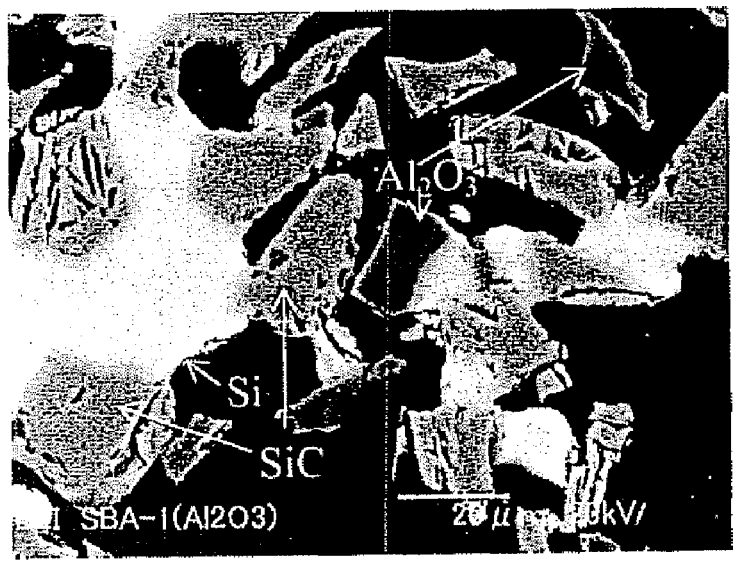
[FIG. 1]
A photomicrograph showing a fine structure of a porous fired body of the present invention using an $Al_2O_3$ particle as an oxide particle.

1 ... Honeycomb filter, 3 ... end surface of the inlet side, 5 ... end surface of the outlet side, 7 ... Partition wall, 9 ... Cell, 11 ... Sealed portion

DESCRIPTION OF THE PREFERRED EMBODIMENT is Hereinafter, the present invention will be explained on the basis of a detailed example. However, the present invention is not limited thereto and it must be understood that various changes, modifications and improvements can be made without departing from the scope of the present invention on the basis of knowledge of those who are skilled in the art.

A porous fired body of the present invention is a porous fired body having a structure that aggregates are bonded by a bonding material, includes SiC particles and oxide particles having a larger thermal capacity per unit volume than SiC (hereinafter simply referred to as an "oxide particle") as the aggregates and includes metallic Si as the bonding material. That is, in case of the present porous fired body, since it contains oxide particles as a part of substitute for SiC in Si—SiC aggregates, it has a higher thermal capacity per unit volume than that of the porous fired body consisting essentially of Si—SiC aggregates.

Here, the "thermal capacity per unit volume" means a value calculated by use of the following equation from a measured value obtained by measuring specific heat and true density of a target. Here, the specific heat is measured by DSC method and values measured at 600° C. are employed. Thermal capacity per unit volume $(J/cm^3 \cdot K)$=Specific heat $(J/kg \cdot K) \times$ True density $(g/cm^3)/10^3$ In the porous fired body of the present invention, volume ratio of the metallic Si in the whole porous fired body is between 8 and 43% by volume. It is preferable that if the volume ratio is between 10 and 40% by volume and is more preferable if the volume ratio is between 12 and 38% by volume. If the volume ratio of the metallic Si in the whole porous fired body is less than B% by volume, the aggregates cannot be sufficiently bonded and therefore strength of the porous fired body is decreased. Meanwhile, if the volume ratio exceeds 43% by volume, thermal capacity of the porous fired body is reduced.

Moreover, in the porous fired body of the present invention, volume ratio of the oxide particles in the whole of the aggregates is between 14 and 55% by volume. It is preferable that if the volume ratio is between 17 and 50% by volume and is more preferable if the ratio is between 20 and 45% by volume. If the volume ratio of the oxide particles in the whole of the aggregates is less than 14% by volume, thermal capacity of the porous fired body cannot be sufficiently high. Meanwhile, if the volume ratio exceeds 55% by volume, thermal diffusivity of the porous fired body is too low and temperature of the porous fired body is easily increased. Here, thermal conductivity is obtained by multiplication of thermal diffusivity, bulk density, and specific heat capacity, and thermal capacity per unit volume is obtained by multiplication of true density and specific heat. However, it is empirically known that increase in temperature of a porous fired body is influenced by thermal capacity per unit volume more than thermal diffusivity or thermal conductivity.

Figure 2:
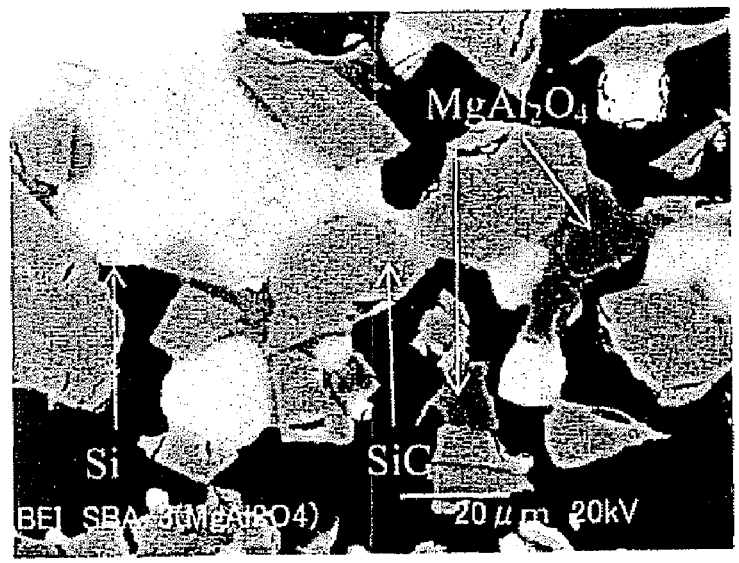
[FIG. 2]
A photomicrograph showing a fine structure of a porous fired body of the present invention using an $MgAl_2O_4$ particle as an oxide particle.

A material of the oxide particles is not especially limited as long as the material is an oxide having larger thermal capacity per unit volume than SiC. For example, a particle of various oxides such as $Al_2O_3$, $MgAl_2O_4$, and mullite $(3Al_2O_3 \cdot 2SiO_2)$ may be used. Among them, using a particle of $Al_2O_3$ and/or $MgAl_2O_4$ is preferable from a viewpoint of thermal capacity, high-thermal stability, and wettability with Si. Here, FIG. 1 is a photomicrograph showing a fine micro-structure of a porous fired body of the present invention using an $Al_2O_3$ particle as an oxide particle and FIG. 2 is a photomicrograph showing a fine structure of a porous fired body of the present invention using an $MgAl_2O_4$ as an oxide particle.

It is preferable that the SiC particles and the oxide particles which are aggregates include one or more particle groups and an average particle size of each particle group is within a range of between 5 and 100 μm, more preferably within a range of between 10 and 85 μm, respectively. If the average particle size of the particle groups is less than 5 μm, pore diameter of the porous fired body becomes too small. Meanwhile, if the average particle size of the particle groups exceeds 100 μm, the pore diameter of the pores formed between aggregate particles becomes too large and porosity becomes too small. Here, the "average particle size" is a value measured by a laser diffraction type distribution measurement apparatus according to JIS R 1629.

It is preferable that ratio of opened pore of the porous fired body of the present invention is between 30 and 75% and is more preferable if the ratio is between 40 and 65%. If the ratio of opened pore is less than 30%, there may be a case where pressure loss is too much increased. On the other hand, if the ratio exceeds 75%, there may be a case where strength and thermal conductivity are too much lowered. Here, "ratio of opened pore" is a value obtained by cutting a specimen having a predetermined shape from a porous fired body and calculating by Archimedes method.

It is preferable that an average pore diameter of the porous fired body of the present invention is between 5 and 50 μm and is more preferable if the average pore diameter is between 7 and 35 μm. If the average pore diameter is less than 5 μm, clogging may be easily caused by a particulate matter (PM). On the other hand, if the average pore diameter exceeds 50 μm, the particulate matter (PM) may not be caught by a filter and passes through the filter. Here, the "average pore diameter" is a value obtained by cutting a specimen having a predetermined shape from a porous fired body and measuring by a mercury porosimeter.

Figure 3:
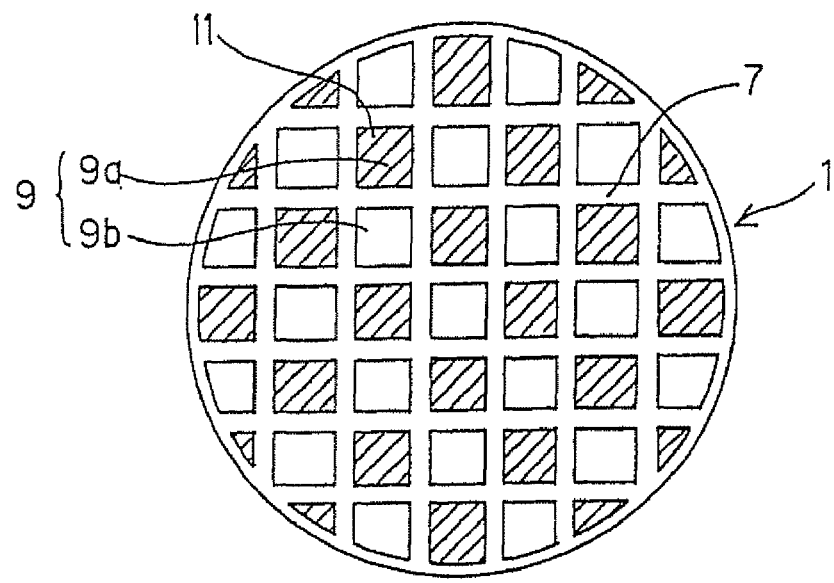
[FIG. 3]
A schematic plan view showing an end surface of a honeycomb filter.
Figure 4:
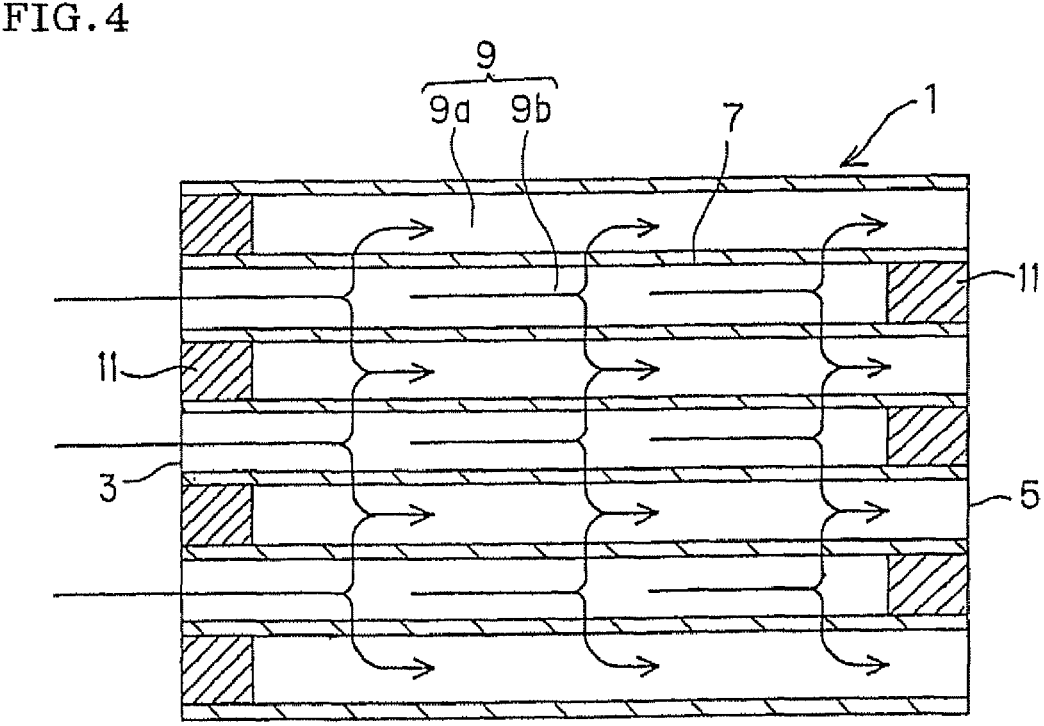
[FIG. 4]
A schematic cross-sectional view showing a cross-section in parallel to axial direction of the honeycomb filter.

An overall shape and structure of the porous fired body of the present invention can be arbitrarily selected according to the usage thereof. For example, if the porous fired body is used as a base material of the DPF, it is preferable that the porous fired body has a structure of a honeycomb shape having an inlet side end surface 3 which is an inlet side of a fluid and an outlet side end surface 5 which is an outlet side of the fluid, and a plurality of cells (through-holes) 9 which are compartments including a partition 7 which forms a flow channel of the fluid, as shown in FIGS. 3 and 4. Such a porous fired body is generally used in a condition where a sealed portion 11 for sealing an open end of a predetermined cell 9a and for sealing an open end of a remaining cell 9b on end surface of the outlet side 5 is provided so that the both surfaces show complementary checkered pattern.

According to a method for manufacturing a porous fired body of the present invention, a base material is prepared, in which SiC particles to be the aggregate including one or more particle groups respectively having an average particle size of between 5 and 100 μm, an oxide particle to be the aggregate including one or more particle groups respectively having an average particle size of between 5 and 100 μm, and a metallic Si to be the bonding material are mixed so that volume ratio of the metallic Si in a finally obtained porous fired body becomes between 8 and 43% by volume and volume ratio of the oxide particles in the whole aggregate becomes between 14 and 55% by volume, and by use of this base material, a clay for forming is produced. Here, in the production of the clay for forming, an organic binder such as methyl cellulose, hydroxyl propoxyl cellulose, hydroxyl ethyl cellulose, carboxy methyl cellulose, polyvinyl alcohol, or the like and water are generally added to the base material and, depending on the necessity, a pore forming agent, a surfactant, or the like is added and then the base material is mixed by a clay mixer, or the like. Thus, a plastic clay for forming is obtained.

Subsequently, the clay for forming is shaped into a predetermined shape. For example, in case of forming into a honeycomb shape, forming can be carried out by a conventionally known extrusion molding method or the like. Processing such as drying or degreasing is carried out to a shaped body thus obtained by the forming and the shaped body is fired under an inert atmosphere such as Ar atmosphere to be a porous fired body having a structure that the SiC particles and the oxide particles as aggregates are bonded by the metallic Si as a bonding material. Here, it is preferable that the maximum temperature for firing is between 1,300 and 1,800° C. and it is more preferable if the maximum temperature is between 1,410 and 1,600° C. If the maximum temperature in the firing is less than 1,300° C., there is a possibility that the aggregate cannot be sufficiently bonded by the metallic Si. On the other hand, if the maximum temperature exceeds 1,800° C., evaporation of the metallic Si is enhanced and it becomes difficult to bond the aggregates.

In a case where a honeycomb shaped porous fired body is manufactured, if a sealed portion is formed in a cell, the firing may be carried out before the sealed portion is formed in the cell or firing may be carried out simultaneously with firing of the sealed portion after the sealed portion is formed in the cell. A conventionally known method may be used as a method to form the sealed portion in the cell. A specific example of the method is as follows: A sheet is attached to an end surface of a honeycomb formed body or a fired body, a plurality of holes is formed at the position of the sheet corresponding to cells to be sealed, the end surface of the formed body or fired body is dipped into a sealing slurry obtained by slurrying a constituent material of the sealed portion, the slurry for sealing is filled in an opening end portion of the cell to be sealed through the hole created on the sheet, and the slurry is dried and/or fired again for hardening. It is preferable that same material as that of the honeycomb is used as the constituent material of the sealing portion for the purpose of reducing difference in thermal expansion between the sealed portion and the honeycomb main body.

Moreover, in a case where a honeycomb shaped porous fired body is manufactured, if the fired body supports a catalyst such as a rare metal for the purpose of enhancing combustion of soot in filter regeneration or purifying a harmful substance in exhaust gas, a powder including a high specific surface area heat-resistant inorganic oxide, for example, such as alumina powder may be dispersed in a solution containing the catalyst with stirring, and then the resultant be dried and fired to obtain a powder including the catalyst. Alumina sol, water, or the like is added to the powder to prepare a slurry for catalyst support. The fired body is dipped into the slurry to coat the fired body with the slurry, dried, and fired so that the catalyst is stabilized in the fired body.

EXAMPLES

Hereinafter, the present invention will be explained more specifically based on examples. However, the present invention is not limited to these examples.

Examples 1 to 5, Comparative Examples 4 to 9

SiC powder, $Al_2O_3$ powder, and metallic Si powder were mixed so that composition (volume ratio) of a porous fired body eventually obtained can have a value shown in Table 1. To 100 parts by mass of the mixed powder, a total of 10 parts by mass of starch and foamed resin as a pore forming agent, 6 parts by mass of methyl cellulose as an organic binder, 2.5 parts by mass of surfactant, and 24 parts by mass of water were added to obtain a plastic clay. Here, the SiC powder and the $Al_2O_3$ powder include particle groups having an average particle size shown in Table 1, respectively. The clay was extrusion molded and dried and a plate-shaped green body having a width of 50 mm, thickness of 4 mm, and length of 20 cm and a rectangular columnar-type honeycomb-shaped green body having a partition with a thickness of 310 μm, a cell with a square shape, a cell density of 46.5 cell/cm$^2$ (300 cells/inch$^2$), a each side of the square is 35 mm in cross-section, and length in axial direction is 152 mm were obtained. Of these green bodies, the plate shaped green body was degreased in an atmosphere at about 400° C. after being dried and then further fired at about 1,450° C. in an Ar inert atmosphere to obtain a plate including a porous fired body in which SiC particles and $Al_2O_3$ particles as aggregates are bonded by the metallic Si as a bonding material. Moreover, an end portion of the cell of the honeycomb-shaped green body was sealed so that an end surface of the green body showed checkered pattern. That is, cells adjacent to one cell were sealed so that the cells are sealed on opposite end portions of the one cell each other. Same material as that of the honeycomb-shaped green body was used as sealing material. After the end portion of the cell was thus sealed, the green body was degreased in an atmosphere at about 400° C. after being dried and then further fired at about 1,450° C. in an Ar inert atmosphere to obtain a honeycomb filter segment including a porous fired body in which SiC particles and $Al_2O_3$ particles as aggregates are bonded by metallic Si as bonding material. However, in cases of the comparative examples 4 and 9, both the plate and honeycomb filter segment collapsed when fired.

Examples 6 to 10

SiC powder, $MgAl_2O_4$ powder, and metallic Si powder were mixed so that composition (volume ratio) of a porous fired body eventually obtained can have a value shown in Table 1. To 100 parts by mass of the mixed powder, a total of 10 parts by mass of starch and foamed resin as a pore forming agent, 6 parts by mass of methyl cellulose as an organic binder, 2.5 parts by mass of surfactant, and 24 parts by mass of water were added to obtain a plastic clay. Here, the SiC powder and the $MgAl_2O_4$ powder are configured by particle groups having an average particle size shown in Table 1, respectively. By use of this clay, forming, drying, degreasing, firing and the like were carried out under the same condition as those in the examples 1 to 5 and comparative examples 4 to 9 to obtain plates and honeycomb filter segments in which SiC particles and $MgAl_2O_4$ particles as aggregates are bonded by metallic Si as a bonding material.

Example 11

22 parts by mass of SiC powder including a particle group having an average particle size of 100 μm, 25 parts by mass of SiC powder including a particle group having an average particle size of 35 μm, 8 parts by mass of SiC powder including a particle group having an average particle size of 10 μm, 8 parts by mass of $Al_2O_3$ powder including a particle group having an average particle size of 100 μm, 9 parts by mass of $Al_2O_3$ powder including a particle group having an average particle size of 35 μm, 3 parts by mass of $Al_2O_3$ powder including a particle group having an average particle size of 10 μm, and metallic Si powder were mixed so that composition (volume ratio) of a porous fired body eventually obtained can have a value shown in Table 1. To 100 parts by mass of the mixed powder, 6 parts by mass of methyl cellulose as an organic binder, 2.5 parts by mass of surfactant, and 24 parts by mass of water were added to obtain a plastic clay. Using this clay, forming, drying, degreasing, firing and the like were carried out under the same condition as that of the examples 1 to 5 and comparative examples 4 to 9 to obtain plates and honeycomb filter segments including a porous fired body in which SiC particles and $Al_2O_3$ particles as aggregates are bonded by metallic Si as a bonding material.

Example 12

11 parts by mass of SiC powder including a particle group having an average particle size of 35 μm, 38.5 parts by mass of SiC powder including a particle group having an average particle size of 10 μm, 5.5 parts by mass of SiC powder including a particle group having an average particle size of 5 μm, 4 parts by mass of $Al_2O_3$ powder including a particle group having an average particle size of 35 μm, 14 parts by mass of $Al_2O_3$ powder including a particle group having an average particle size of 10 μm, 2 parts by mass of $Al_2O_3$ powder including a particle group having an average particle size of 5 μm, and metallic Si powder were mixed so that composition (volume ratio) of a porous fired body eventually obtained can have a value shown in Table 1. To 100 parts by mass of the powder, 25 parts by mass of starch and foamed resin as a pore forming agent, 6 parts by mass of methyl cellulose as an organic binder, 2.5 parts by mass of surfactant, and 24 parts by mass of water were added to obtain a plastic clay. Using this clay, forming, drying, degreasing, firing and the like were carried out under the same condition as that of the examples 1 to 5 and comparative examples 4 to 9 to obtain plates and honeycomb filter segments including a porous fired body in which SiC particles and $Al_2O_3$ particles as aggregates are bonded by metallic Si as a bonding material.

Example 13

14 parts by mass of SiC powder including a particle group having an average particle size of 35 μm, 33 parts by mass of SiC powder including a particle group having an average particle size of 10 μm, 8 parts by mass of SiC powder including a particle group having an average particle size of 5 μm, 5 parts by mass of $Al_2O_3$ powder including a particle group having an average particle size of 35 μm, 12 parts by mass of $Al_2O_3$ powder including a particle group having an average particle size of 10 μm, 3 parts by mass of $Al_2O_3$ powder including a particle group having an average particle size of 5 μm, and metallic Si powder were mixed so that composition (volume ratio) of a porous fired body eventually obtained can have a value shown in Table 1. To 100 parts by mass of the mixed powder, 6 parts by mass of methyl cellulose as an organic binder, 2.5 parts by mass of surfactant, and 24 parts by mass of water were added to obtain a plastic clay. Using this clay, forming, drying, degreasing, firing and the like were carried out under the same condition as that of the examples 1 to 5 and comparative examples 4 to 9 to obtain plates and honeycomb filter segments including a porous fired body in which SiC particles and $Al_2O_3$ particles as aggregates are bonded by metallic Si as a bonding material.

Example 14

49.5 parts by mass of SiC powder including a particle group having an average particle size of 100 μm, 5.5 parts by mass of SiC powder including a particle group having an average particle size of 35 μm, 18 parts by mass of $Al_2O_3$ powder including a particle group having an average particle size of 100 μm, 2 parts by mass of $Al_2O_3$ powder including a particle group having an average particle size of 35 μm, and metallic Si powder were mixed so that composition (volume ratio) of a porous fired body eventually obtained can have a value shown in Table 1. To 100 parts by mass of the mixed powder, a total of 20 parts by mass of starch and foamed resin as a pore forming agent, 6 parts by mass of methyl cellulose as an organic binder, 2.5 parts by mass of surfactant, and 24 parts by mass of water were added to obtain a plastic clay. Using this clay, forming, drying, degreasing, firing and the like were carried out under the same condition as that of the examples 1 to 5 and comparative examples 4 to 9 to obtain plates and honeycomb filter segments including a porous fired body in which SiC particles and $Al_2O_3$ particles as aggregates are bonded by metallic Si as a bonding material.

Comparative Examples 1 to 3

SiC powder and metallic Si powder were mixed so that composition (volume ratio) of a porous fired body eventually obtained can have a value shown in Table 1. To 100 parts by mass of the mixed powder, a total of 10 parts by mass of starch and foamed resin as a pore forming agent, 6 parts by mass of methyl cellulose as an organic binder, 2.5 parts by mass of surfactant, and 24 parts by mass of water were added to obtain a plastic clay. Here, the SiC powder includes a particle group having an average particle size shown in Table 1. Using this clay, forming, drying, degreasing, firing and the like were carried out under the same condition as that of the examples 1 to 5 and comparative examples 4 to 9 to obtain plates and honeycomb filter segments including a porous fired body in which SiC particles and $Al_2O_3$ particles as aggregates are bonded by metallic Si as a bonding material.

[Characteristics and Evaluation of Porous Fired Body]

Average particle sizes and thermal capacity per unit volume of SiC powder and oxide powder ($Al_2O_3$ powder, $MgAl_2O_4$ powder) used as aggregates of porous fired bodies (plate, honeycomb filter segment) obtained by the examples and comparative examples as well as ratio of opened pore, average pore diameter, and thermal capacity per unit volume of the porous fired bodies were measured. Further, evaluation by filter regeneration test was carried out. The results are shown in Table 1. Here, as mentioned above, the comparative examples 4 and 9 collapsed when fired and therefore were not subject to measurement regarding porous fired body and filter regeneration test. Methods of measurement and test are as follows.

(Average Particle Size)

Measurement was conducted according to JIS R 1629 by a laser diffraction type distribution measurement apparatus (product of Shimadzu Corporation: SALD-2000 (product name)).

(Thermal Capacity of Aggregate Per Unit Volume)

Specific heat of each of powders used as aggregates was measured by DSC method as well as true density was measured by a dry automatic density meter (product of Shimadzu Corporation: Accupyc 1330 (product name)). Based on these measured values, thermal capacity of the aggregate per unit volume was calculated by the following equation.

Thermal capacity per unit volume $(J/cm^3 \cdot K)$=Specific heat $(J/kg \cdot K) \times$True density $(g/cm^3)/10^3$ (Thermal Capacity of Fired Body Per Unit Volume)

A specimen having a size of Ø6 mm×1 mm was cut out from the plate and specific heat thereof was measured by DSC method as well as true density was measured by a dry automatic density meter (product of Shimadzu Corporation: Accupyc 1330 (product name)) for which the plate was crushed. Based on these measured values, thermal capacity of the fired body per unit volume was calculated by the following equation.

Thermal capacity per unit volume $(J/cm^3 \cdot K)$=Specific heat $(J/kg \cdot K) \times$True density $(g/cm^3)/10^3$ (Ratio of Opened Pore)

A specimen having a dimension of 10 mm×10 mm×1 mm was cut out from the plate and ratio of opened pore was calculated by Archimedes method.

(Average Pore Diameter)

A specimen having a dimension of 5 mm×5 mm×15 mm was cut out from the plate and average pore diameter was measured by a mercury porosimeter (product of Quantachrome Instruments: Pore Master 60GT (product name)).

(Filter Regeneration Test)

Same materials as the honeycomb filter segment and a bonding material which was obtained by lowering viscosity than the clay were used to bond a plurality of honeycomb filter segments. The honeycomb filter segments were dried for two hours at 150° C. by use of a hot air drier, heat processed at 700° C. in nitrogen atmosphere for one hour, and subsequently outer periphery thereof was processed to have a columnar shape to obtain a columnar honeycomb filter having a diameter of 144 mm×height of 153 mm. The outer periphery of the honeycomb filter was covered by a ceramic non-intumescent mat as a holding member and the filter was put into a can body for canning which is a product of the SUS 409 to have a canning structure. Then, combustion gas including soot generated by combustion of a diesel fuel was caused to flow from one end surface of the honeycomb filter (inlet side end surface) and to flow out from an opposite end surface (outlet side end surface) to collect soot in the honeycomb. Subsequently, the honeycomb filter was cooled to room temperature and combustion gas of 700° C. including a predetermined ratio of oxygen was caused to flow into the filter from end surface of the inlet side of the honeycomb filter to burn the soot and maximum temperature at the center of end surface of the outlet side was measured by a thermocouple. Measurement results in the honeycomb filter of examples 1 to 14 and comparative examples 5 to 8 including an oxide particle as part of aggregates and measurement results of the comparative examples 1 to 3 which do not include an oxide particle as part of aggregates were compared. Ones having the same volume ratio of the aggregate and bonding material were compared to check an effect of reducing the maximum temperature by inclusion of an oxide particle when the filter is regenerated.

TABLE 1

| | | Composition [volume %] | | | | Average particle size of aggregate *1 [μm] | | Thermal capacity of aggregate *2 $[J/cm^3 \cdot K]$ | |
|---|---|---|---|---|---|---|---|---|---|
| | Oxide type | SiC | Oxide | Si | Oxide/ aggregate | SiC | Oxide | SiC | Oxide |
| Example 1 | $Al_2O_3$ | 55 | 20 | 25 | 27 | 35 | 35 | 3.8 | 4.8 |
| Example 2 | $Al_2O_3$ | 41 | 51 | 8 | 55 | 35 | 35 | 3.8 | 4.8 |
| Example 3 | $Al_2O_3$ | 79 | 13 | 8 | 14 | 35 | 35 | 3.8 | 4.8 |
| Example 4 | $Al_2O_3$ | 26 | 31 | 43 | 55 | 35 | 35 | 3.8 | 4.8 |
| Example 5 | $Al_2O_3$ | 49 | 8 | 43 | 14 | 35 | 35 | 3.8 | 4.8 |
| Example 6 | $MgAl_2O_4$ | 55 | 20 | 25 | 27 | 35 | 35 | 3.8 | 4.4 |
| Example 7 | $MgAl_2O_4$ | 41 | 51 | 8 | 55 | 35 | 35 | 3.8 | 4.4 |
| Example 8 | $MgAl_2O_4$ | 79 | 13 | 8 | 14 | 35 | 35 | 3.8 | 4.4 |
| Example 9 | $MgAl_2O_4$ | 26 | 31 | 43 | 55 | 35 | 35 | 3.8 | 4.4 |
| Example 10 | $MgAl_2O_4$ | 49 | 8 | 43 | 14 | 35 | 35 | 3.8 | 4.4 |
| Example 11 | $Al_2O_3$ | 55 | 20 | 25 | 27 | 100, 35, 10 | 100, 35, 10 | 3.8 | 4.8 |
| Example 12 | $Al_2O_3$ | 55 | 20 | 25 | 27 | 35, 10, 5 | 35, 10, 5 | 3.8 | 4.8 |

TABLE 1-continued

| | | | | | | | | | |
|---|---|---|---|---|---|---|---|---|---|
| Example 13 | Al₂O₃ | 55 | 20 | 25 | 27 | 35, 10, 5 | 35, 10, 5 | 3.8 | 4.8 |
| Example 14 | Al₂O₃ | 55 | 20 | 25 | 27 | 100, 35 | 100, 35 | 3.8 | 4.8 |
| Comp. Example 1 | — | 75 | 0 | 25 | 0 | 35 | — | 3.8 | — |
| Comp. Example 2 | — | 92 | 0 | 8 | 0 | 35 | — | 3.8 | — |
| Comp. Example 3 | — | 57 | 0 | 43 | 0 | 35 | — | 3.8 | — |
| Comp. Example 4 | Al₂O₃ | 71 | 26 | 3 | 27 | 35 | 35 | 3.8 | 4.8 |
| Comp. Example 5 | Al₂O₃ | 29 | 11 | 60 | 28 | 35 | 35 | 3.8 | 4.8 |
| Comp. Example 6 | Al₂O₃ | 70 | 5 | 25 | 7 | 35 | 35 | 3.8 | 4.8 |
| Comp. Example 7 | Al₂O₃ | 22 | 53 | 25 | 71 | 35 | 35 | 3.8 | 4.8 |
| Comp. Example 8 | Al₂O₃ | 55 | 20 | 25 | 27 | 200 | 200 | 3.8 | 4.8 |
| Comp. Example 9 | Al₂O₃ | 55 | 20 | 25 | 27 | 2 | 2 | 3.8 | 4.8 |

| | fired body characteristics | | | | |
|---|---|---|---|---|---|
| | Average | | | Filter regeneration test | |
| | Ratio of open pore [%] | pore diameter [μm] | Thermal capacity *3 [J/cm³ · K] | Comparison target | Effect of temperature reduction |
| Example 1 | 45 | 7 | 3.55 | Comp. Example 1 | Yes |
| Example 2 | 49 | 6 | 4.15 | Comp. Example 2 | Yes |
| Example 3 | 49 | 6 | 3.74 | Comp. Example 2 | Yes |
| Example 4 | 41 | 8 | 3.38 | Comp. Example 3 | Yes |
| Example 5 | 41 | 8 | 3.15 | Comp. Example 3 | Yes |
| Example 6 | 45 | 7 | 3.46 | Comp. Example 1 | Yes |
| Example 7 | 50 | 6 | 3.92 | Comp. Example 2 | Yes |
| Example 8 | 50 | 6 | 3.68 | Comp. Example 2 | Yes |
| Example 9 | 41 | 8 | 3.24 | Comp. Example 3 | Yes |
| Example 10 | 41 | 8 | 3.12 | Comp. Example 3 | Yes |
| Example 11 | 60 | 5 | 3.54 | Comp. Example 1 | Yes |
| Example 12 | 34 | 50 | 3.60 | Comp. Example 1 | Yes |
| Example 13 | 30 | 10 | 3.56 | Comp. Example 1 | Yes |
| Example 14 | 75 | 6 | 3.53 | Comp. Example 1 | Yes |
| Comp. Example 1 | 45 | 7 | 3.33 | — | — |
| Comp. Example 2 | 49 | 6 | 3.60 | — | — |
| Comp. Example 3 | 41 | 8 | 3.02 | — | — |
| Comp. Example 4 | Collapsed | | | — | — |
| Comp. Example 5 | 29 | 6 | 2.90 | Comp. Example 1 | No |
| Comp. Example 6 | 49 | 8 | 3.39 | Comp. Example 1 | No |
| Comp. Example 7 | 41 | 8 | 3.91 | Comp. Example 1 | No |
| Comp. Example 8 | 28 | 52 | 3.55 | — | soot leak out |
| Comp. Example 9 | Collapsed | | | — | |

*1: Average particle size of a particle group including the aggregate
*2, *3: Measured value at 600° C.

As shown in Table 1, the examples 1 to 14 including an oxide particle having larger thermal capacity per unit volume than SiC as an aggregate in addition to SiC particles and volume ratio of the metallic Si in the whole porous fired body, volume ratio of the oxide particles in the whole aggregate, and the average particle size of a particle group configuring the SiC particles and the oxide particles, all of which are within regulated range of the present invention, showed an effect of reducing the maximum temperature when the filter is regenerated compared to the comparative examples 1 to 3 which do not include an oxide particle in the aggregates. Meanwhile, the comparative example 5 with the volume ratio of the metallic Si in the whole porous fired body which exceeds the regulated range of the present invention, the comparative example 6 with the volume ratio of the oxide particles in the whole of the aggregate which does not satisfy the regulated range of the present invention, and the comparative example 7 with the volume ratio of the oxide particles in the whole of the aggregate which exceeds the regulated range of the present invention did not show an effect of reducing the maximum temperature when compared to the comparative example 1 which does not include the oxide particles in the aggregate, while the comparative example 8 with the average particle size of a particle group configuring the SiC particles and the oxide particles which exceeds the regulated range of the present invention did not sufficiently function as a filter because soot leaked out in the filter regeneration test.

The present invention can be preferably used as a porous fired body suitable as a base material or the like of a DPF and a manufacturing method thereof.

What is claimed is:

1. A porous fired body comprising:
   aggregates comprising oxide particles and SiC particles, the oxide particles having a larger thermal capacity per unit volume than the SiC particles; and
   a bonding material comprising metallic Si, wherein
   the aggregates are bonded by the bonding material,
   a volume ratio of the metallic Si in the whole porous fired body is between 8 and 43% by volume,
   a volume ratio of the oxide particles in the whole aggregates is between 14 and 55% by volume, and
   the SiC particles and the oxide particles respectively include one or more particle groups, and an average particle size of each particle group is within a range of between 5 and 100 μm.

2. The porous fired body according to claim 1, wherein the oxide is one or more type of oxide selected from the group consisting of Al₂O₃ and MgAl₂O₄.

3. The porous fired body according to claim 1, wherein a ratio of open pores in the porous fired body is between 30 and 75%.

4. The porous fired body according to claim 1, wherein an average pore diameter of pores in the porous fired body is between 5 and 50 μm.

5. The porous fired body according to claim 1, wherein the porous fired body has a honeycomb shape.

6. A method for manufacturing a porous fired body, the porous fired body having a structure where aggregates are bonded by a bonding material, the method comprising:
   mixing the following components as a base material,
      SiC particles as an aggregate, the SiC particles including one or more particle groups, each particle group having an average particle size of between 5 and 100 μm,
      oxide particles as an aggregate having a larger thermal capacity per unit volume than the SiC, the oxide particles including one or more particle groups, each particle group having an average particle size of between 5 and 100 μm, and
      a metallic Si as the bonding material;
   preparing a clay from the base material;
   shaping the clay into a predetermined shape; and
   firing the shaped clay, wherein
   a volume ratio of the metallic Si in the whole porous fired body is between 8 and 43% by volume, and
   a volume ratio of the oxide particles in the whole aggregate is 14 and 55% by volume.

7. The method for manufacturing a porous fired body according to claim 6, wherein a maximum temperature in the firing is between 1,300 and 1,800° C.

* * * * *